US008032402B2

(12) United States Patent
Aleksiejczyk et al.

(10) Patent No.: US 8,032,402 B2
(45) Date of Patent: Oct. 4, 2011

(54) ITINERARY SEARCH TOOL FOR TERRITORY MANAGEMENT

(75) Inventors: Kim Aleksiejczyk, Wilton, CT (US);
Balaji Chellappa, Stamford, CT (US);
Mietek Ciszkowski, Milford, CT (US);
Sayee Natarajan, Norwalk, CT (US);
Jake Stahl, Milford, CT (US);
Ramachandran Subramanian, Norwalk, CT (US)

(73) Assignee: Purdue Pharma L.P., Stamford, CT (US)

( * ) Notice: Subject to any disclaimer, the term of this patent is extended or adjusted under 35 U.S.C. 154(b) by 379 days.

(21) Appl. No.: 11/925,512

(22) Filed: Oct. 26, 2007

(65) Prior Publication Data

US 2008/0281858 A1 Nov. 13, 2008

Related U.S. Application Data

(60) Provisional application No. 60/863,243, filed on Oct. 27, 2006, provisional application No. 60/868,027, filed on Nov. 30, 2006.

(51) Int. Cl.
*G06F 7/00* (2006.01)
(52) U.S. Cl. ...................................... 705/7.13
(58) Field of Classification Search .................... 705/8, 9
See application file for complete search history.

(56) References Cited

U.S. PATENT DOCUMENTS

| 5,644,722 | A | 7/1997 | Miyamoto et al. | |
|---|---|---|---|---|
| 6,012,037 | A | 1/2000 | Yoshikawa | |
| 6,272,074 | B1 | 8/2001 | Winner | |
| 6,327,570 | B1 * | 12/2001 | Stevens | 705/7 |
| 2002/0173990 | A1 * | 11/2002 | Marasco | 705/2 |
| 2003/0135402 | A1 * | 7/2003 | Moore | 705/8 |
| 2005/0125273 | A1 | 6/2005 | Simons et al. | |
| 2005/0222886 | A1 * | 10/2005 | Sridharan | 705/8 |
| 2006/0026051 | A1 * | 2/2006 | Rose | 705/8 |
| 2006/0116918 | A1 * | 6/2006 | Flora et al. | 705/8 |
| 2006/0293930 | A1 * | 12/2006 | Rodgers et al. | 705/5 |

(Continued)

FOREIGN PATENT DOCUMENTS

WO WO 2007/002280 1/2007

(Continued)

OTHER PUBLICATIONS

Falvey, J.; Sales Force Management; Apr. 1988; Sales and Marketing Management; 140, 5; ABI/Inform Global; p. 17.*

(Continued)

*Primary Examiner* — Susanna M Meinecke Diaz
*Assistant Examiner* — Ashley Chou
(74) *Attorney, Agent, or Firm* — Leason Ellis LLP

(57) ABSTRACT

Electronically creating an itinerary schedule in a calendar program. A geographic indicator and a calendar date are acquired and coordinated with each other to define an itinerary entry. The itinerary entry is included into a calendar program maintained by the machine. The step of acquiring the geographic indicator further comprises the step of updating a counter upon each selection of a geographic indicator. Another method electronically populates a calendar program with an event using an itinerary entry. Optionally, health care providers from within a geographic indicator are included in the itinerary entry. A geographic indicator and calendar date are obtained from an itinerary entry, and additional search criteria are input. A search of a database is executed to identify candidates matching the geographic indicator and search criteria. Candidate matches are assigned to a time slot, and each time slot is populated into the calendar program on the calendar date.

20 Claims, 7 Drawing Sheets

U.S. PATENT DOCUMENTS

| | | |
|---|---|---|
| 2007/0185744 A1 | 8/2007 | Robertson |
| 2008/0103856 A1* | 5/2008 | Ciszkowski et al. .............. 705/7 |
| 2008/0103870 A1 | 5/2008 | Aleksiejczyk et al. |

FOREIGN PATENT DOCUMENTS

| | | |
|---|---|---|
| WO | WO-2007/002280 | 1/2007 |

OTHER PUBLICATIONS

Zhong, H., et al.; Territory Planning and Vehicle Dispatching With Driver Learning; Dec. 17, 2004; United Parcel Service; pp. 1-33.*

U.S. Appl. No. 11/925,552, Mietek Ciszkowski, et al.

U.S. Appl. No. 11/925,565, Aleksiejczyk et al.

* cited by examiner

FIG. 4A

Customers by Zip

| City | Zip | City Count | Zip Code Count | Customer Count | Call List Count | Visited Call Count |
|---|---|---|---|---|---|---|
| Reno | 89502 | 7 | 0 | 233 | 19 | 15 |
| Reno | 89511 | 7 | 2 | 144 | 17 | 10 |
| Sparks | 89434 | 4 | 3 | 89 | 13 | 7 |
| Reno | 89503 | 7 | 0 | 55 | 11 | 8 |
| Carson City | 89703 | 5 | 3 | 34 | 7 | 5 |
| Carson City | 89705 | 5 | 2 | 21 | 5 | 2 |
| Sparks | 89431 | 4 | 1 | 13 | 3 | 2 |
| Reno | 89509 | 7 | 5 | 2 | 2 | 1 |

FIG. 4B

Home | Lists | Calls | Customer | Promo. Order | Reports | Admin

Calendar   Call   Meeting   Time Off   Itinerary/Schedule

Quarter: Q1 2006

View: ● Edit  ○ Read Only

Submit

Itinerary

| Date Range | Monday | Tuesday | Wednesday | Thursday | Friday |
|---|---|---|---|---|---|
| Sept 18–Sept 22 | 89511,89521 | 89511,89521 | 89509,89434 | 89509,89434 | 89509,89434 |
| Sept 25–Sept 29 | 89431 | 89675 | Sparks | 86543 | 89222 |
| Oct 02–Oct 06 | | | | | |

Fig. 6

Appointment/Drop-In Schedule

Appointment/Drop-In Date  09/25/2006

[Refresh] [Schedule] [Back]

| Include? | Name | Specialty | Call Date | Street,City,State,Zip | Start Date | Start Time | End Time | Activity |
|---|---|---|---|---|---|---|---|---|
| ☑ | Sue | NPR | 05/25/2006 | Sparks,NV 89431 | 09/25/2006 | 9:00 AM ▾ | 9:30 AM ▾ | Appointment ▾ |
| ☑ | Dan | IM | 05/25/2006 | Sparks,NV 89431 | 09/25/2006 | 9:30 AM ▾ | 10:00 AM ▾ | Drop-In ▾ |
| ☑ | Betty | NPR | 05/26/2006 | Carson City,NV 89675 | 09/26/2006 | 1:00 PM ▾ | 2:00 PM ▾ | Drop-In ▾ |
| ☑ | Stan | IM | 05/26/2006 | Carson City,NV 89675 | 09/26/2006 | 1:00 PM ▾ | 4:30 PM ▾ | Drop-In ▾ |
| ☑ | Lou | IM | 05/26/2006 | Carson City,NV 89675 | 09/26/2006 | 5:00 PM ▾ | 5:30 PM ▾ | Drop-In ▾ |
| ☑ | Guy | NPR | 05/27/2006 | Sparks,NV 89431 | 09/27/2006 | 2:00 PM ▾ | 3:30 PM ▾ | Drop-In ▾ |

ITINERARY SEARCH TOOL FOR TERRITORY MANAGEMENT

This patent application claims the benefit of priority under 35 U.S.C. §119(e) of U.S. Provisional Application Ser. No. 60/868,027, filed Nov. 30, 2006, entitled "Itinerary Search Tool For Territory Management," and of U.S. Provisional Application Ser. No. 60/863,243, filed Oct. 27, 2006, entitled "Territory Management System," which are hereby incorporated by reference in their respective entireties.

FIELD OF THE INVENTION

The present invention relates to tools for the creation of an itinerary for field representatives of manufacturers and service providers, and, more particularly, to software, systems and methodologies that assist in the creation of an itinerary based on customer data.

BACKGROUND OF THE INVENTION

Manufacturers and service providers often employ field representatives to assist in the sales and marketing of goods and services. In order to provide these services, representatives are required to engage in direct customer contact. This contact enables the field representative to, among other things, establish a relationship with the customer, provide product education and obtain consumer feedback. On the other hand, it requires careful management of time to ensure coverage of the representative's territory.

It is important for field representatives to optimize coverage of their respective territories. Planning future sales calls based on geography facilitates travel planning thus maximizing efficiency. Likewise, establishing an itinerary that provides for the creation of a daily schedule of customer calls within a geographic region, based further on criteria such as time since last call and sales history, would provide the field representative with a tool necessary for ensuring adequate customer contact within a specified territory. The present invention addresses one or more of these needs and others.

SUMMARY OF THE INVENTION

In accordance with one aspect of the invention, a computer-assisted method for electronically creating an itinerary schedule for a representative in a calendar program is described. Through an interactive user-interface, a first set of geographic indicators and a second set of calendar dates are acquired. Interacting with the user-interface, at least one geographic indicator from the first set is coordinated with at least one calendar date in the second set, thereby defining an itinerary entry. The itinerary entry is included into the calendar program on respective dates which correspond to the calendar date.

In a variation of this aspect of the invention, before the itinerary entry is included into the calendar program, one or more health care providers associated with at least one geographic indicator can be selected. The so-selected health care provider is included in a time slot in the calendar program as part of the itinerary entry.

In accordance with further aspects of the foregoing method, the step of acquiring the first set of geographic indicators further comprises informing a user through the interface of a degree of coverage of any particular city or Zip Code within the users territory. In one particular method, this is done by updating a counter upon each selection of the geographic indicator through the user-interface.

In accordance with another aspect of the invention, a computer-assisted method for electronically creating events for inclusion in a calendar program is described. A geographic indicator and calendar date is obtained. A search of a database is executed to identify at least one candidate having a matching geographic indicator. At least a portion of any candidate matches are assigned in the memory to a time slot within the calendar date. One or more time slots of the calendar program are populated with the memory assignments.

In accordance with still another aspect of the invention, a computer-assisted method for electronically populating a calendar program for a representative with an event is described. A geographic indicator and calendar date is obtained from an itinerary entry. One or more search criteria is input. A search of a database is executed to identify at least one candidate matching the geographic indicator and one or more of the search criteria. At least a portion of any candidate matches are assigned to a time slot within the calendar date into the memory of the machine. Each time slot of the calendar program is populated with the memory assignments for the calendar date.

These and other aspects, features and advantages of the invention are described in connection with certain embodiments and the accompanying drawing figures.

DESCRIPTION OF THE DRAWINGS FIGURES

FIG. 4A is a first part of a sample itinerary in edit view, presented through the user interface of a machine;

FIG. 4B is a second part of a sample itinerary in edit view connected to FIG. 4A along match lines A-A', presented through the user interface of a machine;

FIG. 6 is a sample calendar event listing in an editable table-format view, presented through the user interface of a machine.

DETAILED DESCRIPTION OF CERTAIN EMBODIMENTS

Figure 1:
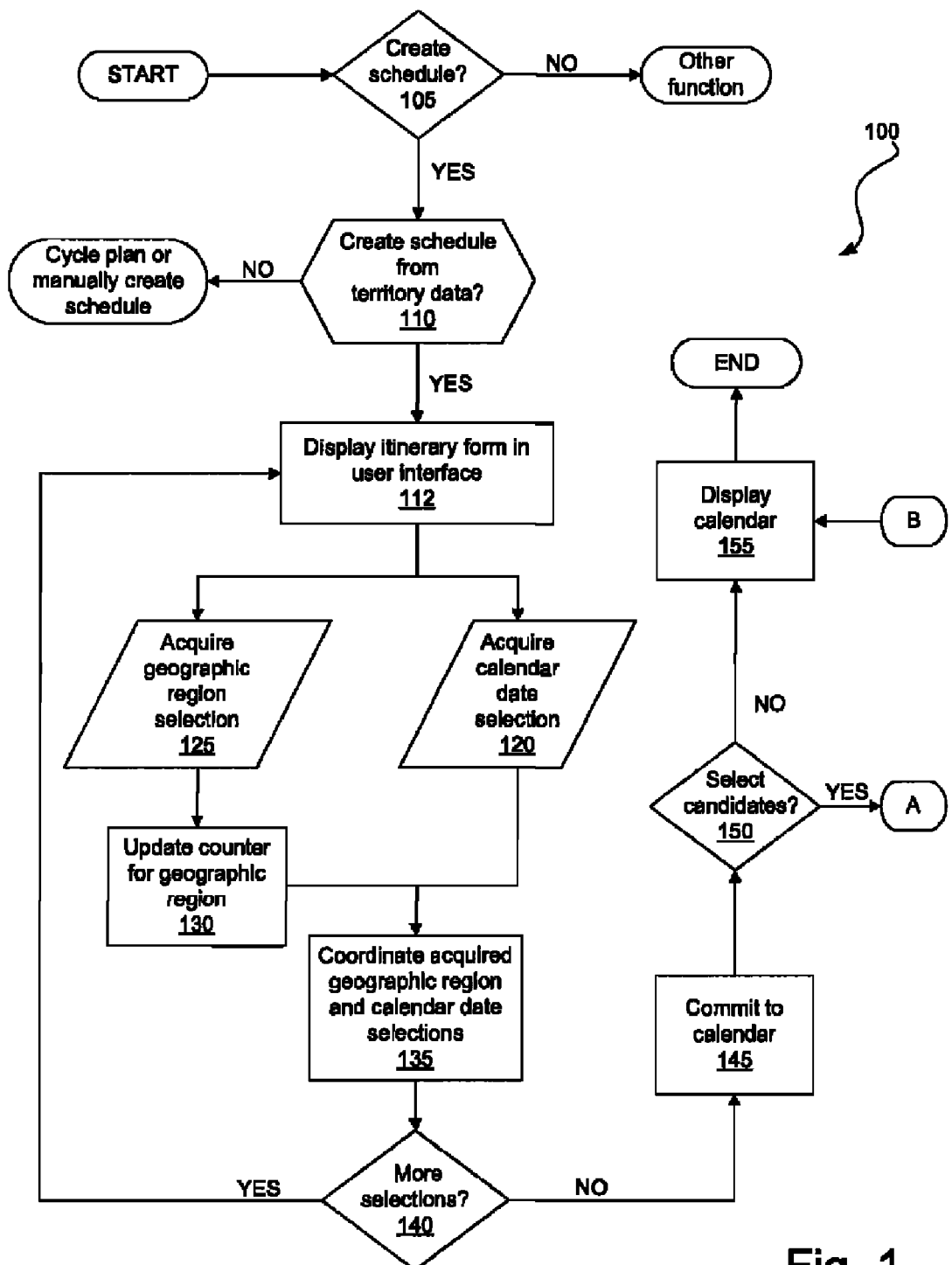
FIG. 1 is a flow diagram illustrating certain steps, in accordance with one embodiment of the invention, relating to the creation of an itinerary and calendar of events.

By way of overview and introduction, representatives can be provided with a tool for conducting their activities in an efficient manner, and, in particular, for scheduling field events, such as visits with health care professionals ("HCPs") or other customers of the representative.

The scheduling tool can be part of a territory management system, preferably implemented as a software-based system having components executing on a number of systems including a central computer and a multiplicity of remote machines. Each representative can have a remote machine for his or her personal use and for forwarding customer data or scheduling information to a location associated with or accessible by the central computer. Without loss of generality, the present invention is described in relation to a particular representative using a single remote machine in the course of his or her activities covering an assigned territory. While the described embodiment has the database and calendar stored on a machine used by the representative, it can be stored on different machines, such as the central computer or on a workstation component that cooperates with a comparatively thin client with which the representative interacts. In the preferred embodiment described below, the representative is bespoke or contracted to a pharmaceutical manufacturer, and the representative "covers" a territory through visits to physicians and nurses (more generally, "prescribers") at which the representative is able to discuss and promote the use of the manufacturer's products.

The remote machine used by the representative includes a suitable complement of hardware and software including, by way of example, a processor, memory, an accessible database, communications equipment, and input/output devices. The remote machine also includes a calendar program, which can be part of a territory management system, including a local database containing customer data, preferably implemented as a software-based system having components executing on the remote machine and a central computer.

A preferred software tool for territory management is described in the aforementioned U.S. Provisional Application Ser. No. 60/863,243, entitled "Territory Management System." The Territory Management Software system provides through a Web-browser interface a number of tools that assist the representative in planning, recording, and tracking activities with customers such as prescribers. In relevant part, the territory management system assists in scheduling site visits to HCPs or other customers by providing calendar functions, as shown, for example, in FIG. 7. The calendar program can be integral to the territory management software, or can be a third-party software program integrated through two-way compatible data exchange. For example, entries can be exported to, or imported from, an external calendar program using a suitable data format. The Territory Management System software also includes features that assist a representative with compliance issues concerning certain state or federal requirements (e.g., limits and restrictions concerning expenditures on health care professionals), and can assist in reducing discrepancies in sample inventories as between stored and on-hand inventories. Various features of the Territory Management System software are described in certain provisional patent applications, which are also now co-pending and are referenced below to the extent they have pertinence to the discussion of the present invention.

In the area of pharmaceutical representation, it is common for a representative to drop-in on a prescriber within the representative's assigned territory with the hope that the prescriber will be able to speak with the representative for a few minutes. The nature of such visits can vary from informal to formal, but one objective of the representative is to promote a prescriber's familiarity and understanding of certain pharmaceuticals. In other fields, the representative similarly has an objective of promoting his or her represented products and services through educational and promotional efforts. A scheduled entry results in a "call note," which records the visit in the local database of the machine, and which documents who was met, what products (services) were discussed, whether samples were provided (and details concerning same), whether any adverse event information was discussed. The representative typically schedules a number of site visits during the course of a day to various customer offices, whether scheduled as an appointment or drop-in, and these visits can be arranged using the tools described herein or using additional calendar functions as described in co-pending U.S. Provisional Application Ser. No. 60/868,015, filed on Nov. 30, 2006, entitled "Cycle Planning Tool For Territory Management" ("Cycle Planning disclosure"), which is hereby incorporated by reference in its entirety. Cycle planning provides for the creation of a future schedule of events, typically based on previously scheduled events, and among other functions, allows a representative to "replicate" an existing schedule (or itinerary), within a span of dates, onto a future span of calendar dates.

A sales representative seeks to visit customers of importance to his or her company, and can use the cycle planning feature when creating a schedule. However, in order to build upon an existing customer base, the representative is also tasked with adequately covering a geographic region with sales calls. In order to do this more effectively the representative can create a schedule based on geographic criteria in accordance with a salient aspect of the present invention. This is accomplished through the use of the itinerary, which is, in one instance, a coordination of geographic regions with calendar dates. However, in order to develop an effective itinerary, the sales representative needs guidance.

A field representative plans a future schedule of events, within his or her assigned territory, with a goal of achieving a number of visits in any given day with a degree of efficiency and effectiveness. Using an itinerary to plan a schedule generally involves selecting geographic regions within a field representative's territory, and assigning those regions to a calendar date. In this way the representative defines what area or areas he or she will visit on a given day. A sales territory may be described by a number of geographic indicators, such as city, county, state or U.S. Zip Code. To plan specific sales calls using an itinerary, a selection of customers is made from those within the geography selected for visiting on any given calendar day. This selection of customer visits within a region is done either automatically by the itinerary search tool, or manually by interacting with the user interface, such as from a list of candidates. A candidate is a customer presently under consideration for entry into the calendar program as an event. The event is a sales call, for example, or other action on the part of the representative, for or with the customer. Both the automatic and manual selection of candidates can further be made based on additional criteria, selected from customer data. The search criteria used to select a sales call candidate, from within a specified region, can be chosen to meet the needs of the individual representatives, their managers and the business sector within which the tool is being implemented. The field representative can plan future events on a weekly, monthly, quarterly, semi-annual or yearly basis, if desired. Additionally, the representative can plan a schedule of future events for a single day or a fraction of a day.

Figure 2:
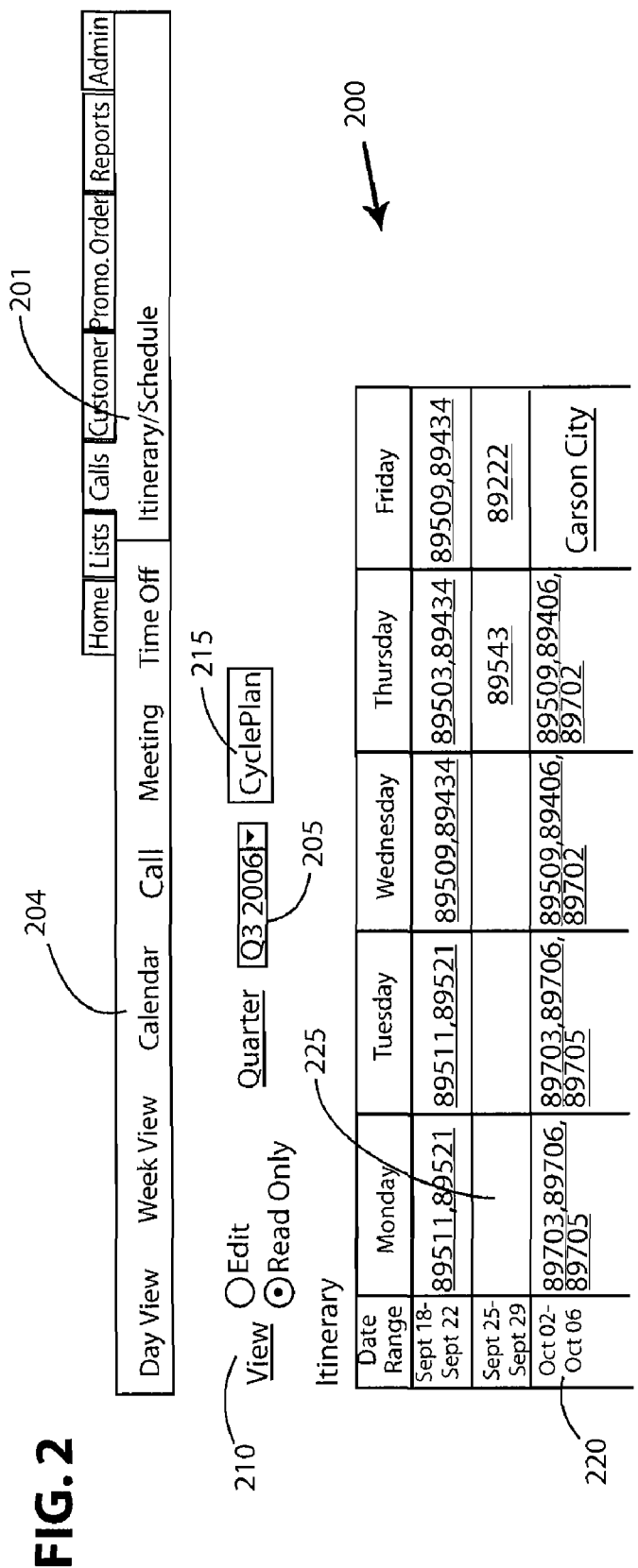
FIG. 2 is a sample itinerary in report view, presented through the user interface of a machine.

Referring now to FIG. 1, a flow diagram illustrates functionality suitable for electronically creating an itinerary and using it to plan a schedule of events. The process 100 may be initiated at any time during an active user session, for example from an itinerary report view 200 as shown in FIG. 2. In FIG. 2, a multi-week view of an exemplary itinerary is presented. This view can be made available through routine navigation by selecting tab 201 from the navigation bar within the territory management software system. The process commences at block 105 at which point the representative chooses to create a schedule. If the user does not wish to create a schedule, he or she may choose another function such as those related to expense reporting, sample inventory control or adverse-event data capture, management and reporting as described in the following co-pending applications: U.S. Provisional Application Ser. No. 60/867,906, filed on Nov. 30, 2006, entitled "Pharmaceutical Representative Expense Report Management Software, Systems, And Methodologies," U.S. Provisional Application Ser. No. 60/867,903, filed on Nov. 30, 2006, entitled "Inventory Control Over Pharmaceutical Sample Distributions Software, Systems And Methodologies," and U.S. Provisional Application Ser. No. 60/867,923, filed on Nov. 30, 2006, entitled "Adverse Event Data Capture Software, Systems, And Methodologies", which are each hereby incorporated by reference in their respective entireties.

Referring again to FIG. 1, in the process flow 100, creating an itinerary is based on allocating a set of geographic regions to a set of calendar dates, such as may be viewed in either the itinerary report or calendar of the representative, both of which are provided in electronic form by the territory system. A user who elects to create a schedule without using territory data chooses another option at block 110, such as cycle planning or manually filling in appointments using the calendar function. Cycle planning allows a user to replicate a set of previously scheduled calendar events or itinerary entries onto a future date. The process cycle planning is described in the Cycle Planning disclosure referred to above. Cycle planning is initiated in the territory management software system by selecting the Cycle Plan button 215 in view 200 of FIG. 2. Alternatively, manually populating a calendar with sales calls is performed in the calendar function, which can be accessed using the Calendar button 204 in the navigation bar.

The user is presented with the itinerary view in read-only mode, as indicated by the radio buttons at 210. This view is showing a date range with date labels at 220. An alternate set of weeks can be displayed by selecting the drop-down menu at 205. In an additional embodiment, the user can be provided with a pop-up calendar to assist in selecting the date range or can enter the date directly into a text box. For the present example, the calendar dates September 25, 26 and 27 at 225 in the itinerary are empty and have not yet been assigned an itinerary entry. Proceeding from block 110, the user generates an itinerary, by selecting the Edit radio button at 210 as shown in FIG. 2. At block 112 the user is presented with an editable view of the itinerary screen. An exemplary itinerary view in edit mode is shown in FIGS. 4A and 4B. Exemplary view 400 displays an itinerary for the weeks of September 18 through Sep. 29, 2006. This view is showing a date range with date labels at 405. An alternate set of weeks can be displayed by selecting the drop-down menu at 406. The user can be provided with a pop-up calendar to assist in selecting the date range or enter the date into a text screen. The itinerary mode can be exited, for example to access another function, using various interface controls such as the Calendar tab 404.

The itinerary edit mode view displays an additional window to the user, labeled "Customers by Zip" and shown in FIG. 4A. This window displays data pertinent to the selection of regions during the creation of an itinerary. In this example, each city and Zip Code in the representatives territory is listed in tabular format in region 450. The number of planned sales calls that have been entered into the itinerary plan in FIG. 4B within a particular city and Zip Code are shown at 415 and 420, respectively, along with the number of customers located in each region in the Customer Count column 425, and the number of prescribers on an active call list in the Call List Count column 430. The Visited Call Count column at 440 displays the number of previously made customer calls within each region to the prescribers included in the Call List Count Column. Optionally, further counters can be provided in further columns such as a number of active prescribers or a percentage of active subscribers called upon in each zip code. The display of counts in 415, 420, 425 and 430 provides pertinent information to the representative when planning an itinerary. In addition, coverage of a sales territory is complicated by the fact that a city can contain a multitude of Zip Codes. For example, this representative has seven total itinerary entries for the city of Reno, but all of these visits are planned for the Zip Codes 89511 and 89509, and this representative does not have any visits currently planned for the Reno Zip Codes 89502 or 89503. Guided by the display in FIG. 4A of the present invention, the representative can plan an itinerary matching the need to serve all of his or her territory.

Referring now to FIG. 1, an itinerary entry is made when the user populates calendar dates with regional (geographic) indicators, such as City or Zip Code data. In one embodiment, the user first activates the cursor function of the user interface within a window representing the desired calendar date at block 120, then selects one or more city and Zip Code designators from region 450. Each geographic indicator is assigned to the active calendar date at block 125 when selected by the user. FIG. 4B shows some of these entries in the itinerary view of the territory management system. The user instead can activate the geographic indicator by selecting 450 with a cursor, and then populate one or more calendar dates by selecting any number of cells 410. In both cases a geographic indicator and calendar date are coordinated, thus creating an itinerary entry in the memory of the machine at block 135.

Once a geographic indicator and calendar date are coordinated, they are committed to the calendar at block 145. At this point a user can choose not to select candidates at block 150 (effectively choosing not to assign customers to the calendar entry) and the calendar is displayed at block 155. In this case, the itinerary search tool enables the user to commit geographic locations, without specific customers identified, to a particular calendar date. Such a utility is useful, for example, to a sales representative desiring to plan sales calls based on geography, and to plan for travel arrangements in advance, without requiring knowledge of which customers will, or will not, be called upon. Candidate matching can be performed at block 305 in FIG. 3 at any time in the future by selecting a geographic location from within an active calendar view, such as itinerary cell 410 of FIG. 4. The process of candidate matching is described in detail below.

In a preferred embodiment, counters 415, 420 are updated at block 130 with each addition or removal of a geographic indicator from calendar date 410. By applying an additional city or Zip code to a calendar date 410, the counter is incremented by one for each city or Zip code added. Likewise, the counter is decremented by one, at block 130, for each city or Zip Code removed from calendar date 410. The counter value is displayed at 415 for the city count and 420 for the Zip Code count. In one embodiment, the counter displays at 415 and 420 are actively updated with each geographic indicator selected. The actively updated counter, described above and shown in FIG. 4A, provides the sales representative with guidance in creating his or her itinerary by tracking sales calls within a geographic region by displaying the results in an actively-updated environment. The count information can optionally be depicted graphically. The active sales call counts displayed at 415 and 420 assist the field representative in avoiding coverage gaps in sales calls due to lack of guidance.

By allowing the creation of itinerary entries based on geographic location alone, and by providing counters to track the number of sales call events in a particular geographic region as the calendar is being created, presents a departure from prior itinerary and calendar creation models. Existing algorithms require that calendar entries be populated with sales calls to specific individuals, yet that presents an impediment to rapid scheduling of a representative's time and location requirements. Also, some prior packages have require that sales call events (or slots) be available to a specific sales representative before a calendar entry can be made, which in turn requires connectivity and coordination of calendars maintained by the sales representative and his or her sales prospects to determine availability which again presents an impediment to rapid scheduling of a representative's time and location requirements. The itinerary search tool described herein has no such limitations, and provides the capability to completely, or partially, create an itinerary based on geographic location, customer sales calls, or both, and to do so independent of (and even before) a determination of which customer is to be called upon on the so-scheduled itinerary.

Referring again to FIG. 1, at block 135, the date and geography information are coordinated into a cell 410 of the itinerary plan. Then, if decision block 140 determines that the user will create additional itinerary entries, the process proceeds to block 112 and continues as described above. If decision block 140 determines that the user will not create additional itinerary entries, the process proceeds to block 145 and the itinerary is committed to the calendar program maintained by the machine. This is accomplished, for example, by selecting the Submit button 435 in FIG. 4. At decision block 150, the user is provided with an opportunity to create a schedule of sales calls from the itinerary, by proceeding to process 300 in FIG. 3. If, the user decides not to select candidates at decision block 150 The calendar can be presented at block 155 and the process ends, as indicated by the termination block. The user can be presented with the edit-only itinerary view in FIG. 2, containing the added itinerary entries. At this point the user can take other actions using the territory management software, as described herein. For example, the user has the opportunity to create a sales call schedule at a later time. This option is advantageous to the field representative wishing to replicate the itinerary using the cycle planning function before converting it into a sales call schedule.

Figure 3:
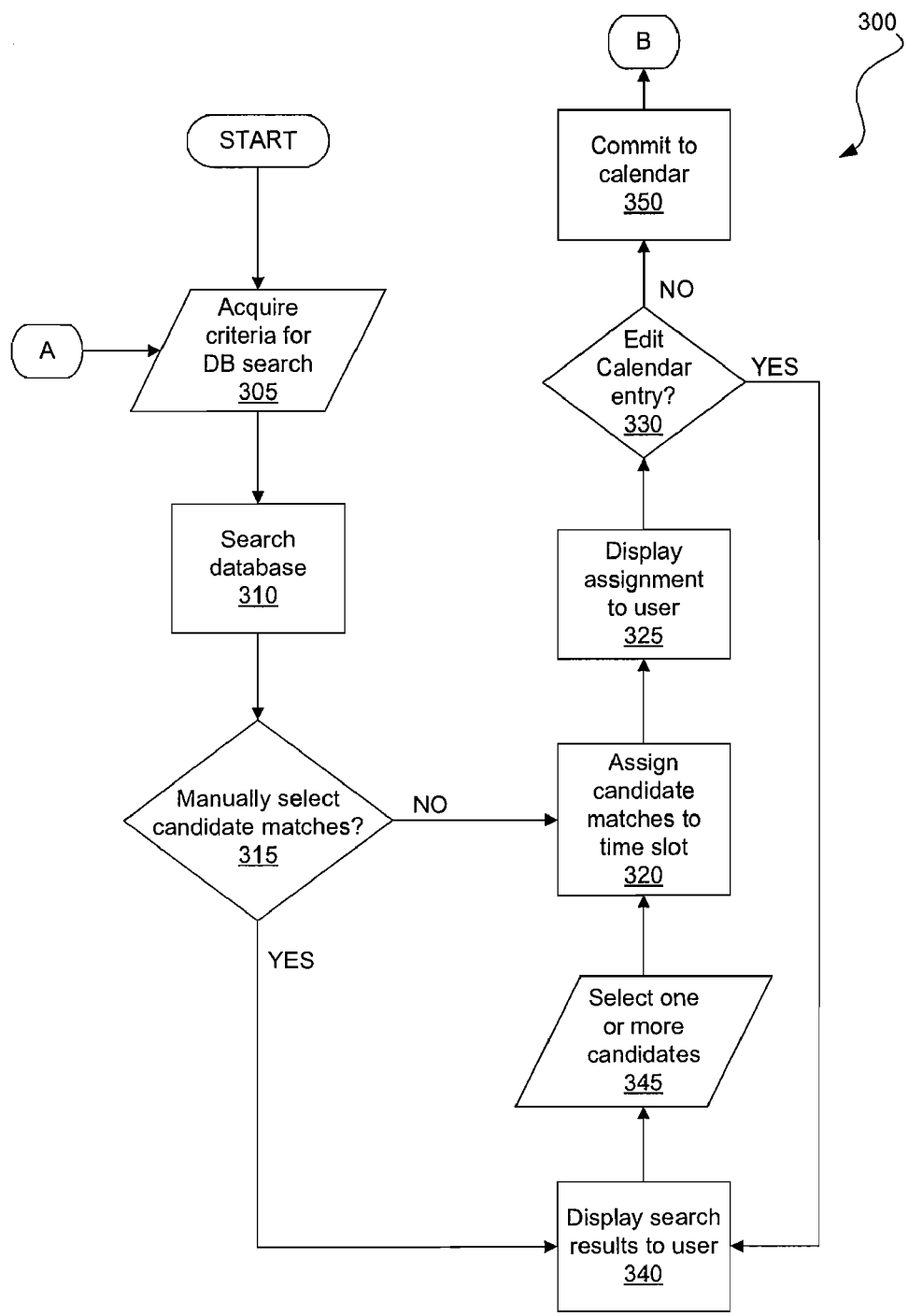
FIG. 3 is a flow diagram illustrating certain steps, in accordance with another embodiment of the invention, relating to the creation of a calendar of events from an itinerary and customer data.

On the other hand, if the decision at block 150 is to select candidates, the process proceeds through connector A to flow diagram 300 in FIG. 3. Process 300 in FIG. 3 illustrates a process flow in accordance with the present invention which assigns a specific event, in this case a sales calls to a customer, to the geographic region and calendar date that were specified by the itinerary entry or entries created in the flow process 100 in FIG. 1.

Figure 5:
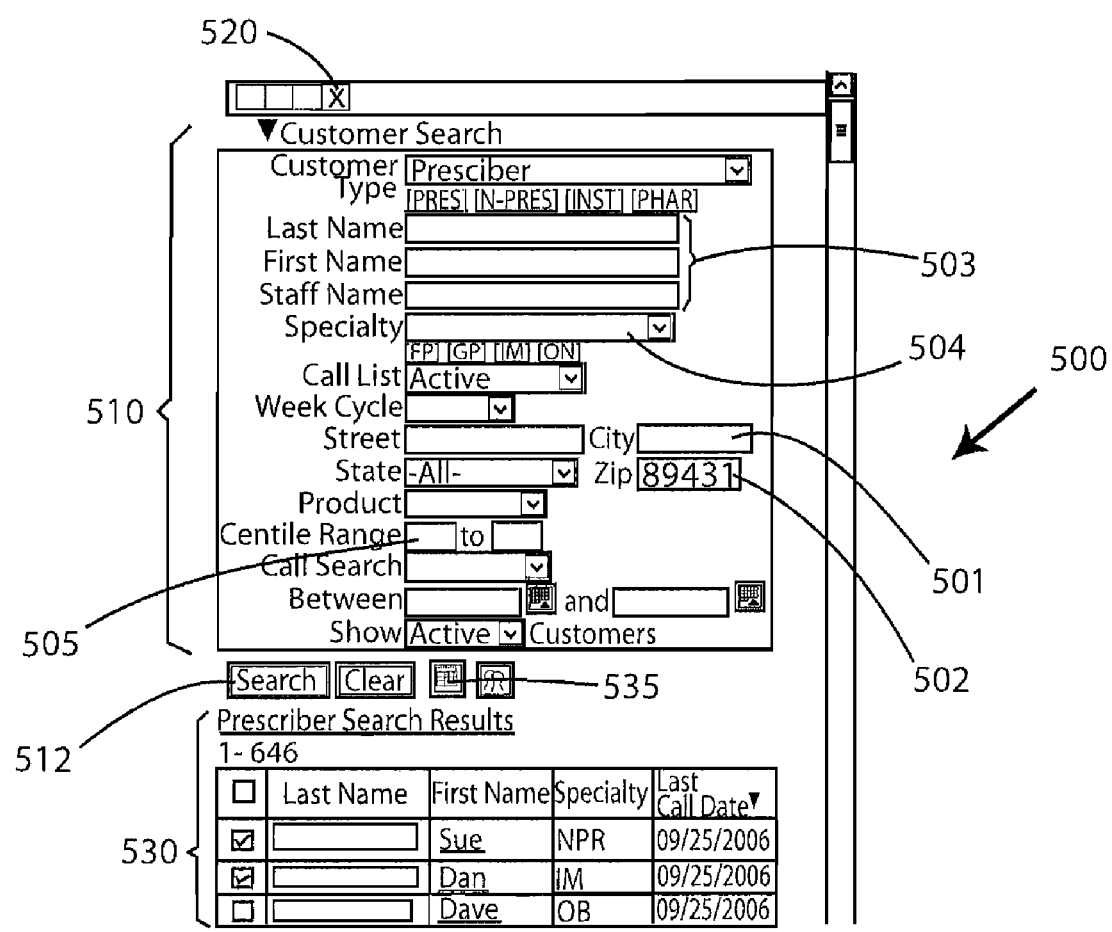
FIG. 5 is a sample search form which is suitable for geographic indicator data such as city or U.S. Zip Code, and for inputting one or more additional criteria.

Referring now to FIG. 3, process 300 begins at block 305 when the user initiates a search for candidates within a geographic region by selecting a geographic indicator from an itinerary cell 410 of FIG. 4. In one mode, the geographic indicator acquired at 305 is used as the search criteria and the database search at block 310 is initiated automatically. Further to this embodiment, no manual selection of candidates is made at decision block 315, and the candidates are automatically assigned to a time slot at block 320, preferably in accordance with a rule base that governs the automated selection. In another mode, a search window 500 in FIG. 5 is displayed (until closed or hidden using control 520) through the interface to assist the user in inputting and organizing search criteria. A geographic indicator can be selected in order to populate the City or Zip Code search field at 501 and 502, respectively. For example, user selection of the geographic indicator in itinerary cell 410 populates the Zip Code search field with the Zip Code 89431 at 502.

Referring now to FIG. 5, the search window 500 provides for the input of search criteria in addition to the geographic indicator. The search criteria can include various search fields, as shown in region 510, as well as other fields suitable for querying the database for any information therein, including the various criteria described herein. Additional search criteria may be, by way of example, customer name 503, specialty 504, centile range 505, or previous call date 506 as shown at window 500 in FIG. 5. Search criterion may also include additional customer information such as the time since the last sales call or other prescriber data For example, the field representative may select search criteria designed to identify the newest health care providers ("HCPs") within a certain city, such as Reno, Nev. The criteria can be entered by selecting one or more predetermined criteria from a series of drop-down menus or selection lists.

Referring again to FIG. 3, the database can be searched for criterion matches at block 310, which is initiated through user selection of the Search button at 512. In one mode, the decision block at 315 decides not to manually select candidates, and the candidate matches identified in the search are automatically selected and assigned to a time slot at 320. In another mode, the decision block at 315 decides to manually select candidates, and the process proceeds to block 340 where the search results are presented to the user through the user interface. Results of any search can be shown in tabular form, like the table in region 530 of the search window. In the present example, Dr. Sue, Dr. Dan and Dr. Dave appear as customers within the list at 530. These three prescribers appear in this view because their customer data entry in the database indicates that they have an addresses within the 89431 Zip Code, and are candidate matches with the geographic indicator. Candidates are selected at block 345 from the candidate matches displayed in region 530 of FIG. 5. Candidates can be selected from the list of matches by checking a check box next to the candidate entry at 530 and selecting the calendar icon at 535 in FIG. 5. In the present example, Dr. Sue and Dr. Dan, but not Dr. Dave, are selected for assignment to a time slot.

Referring again to FIG. 3, the candidates selected at 345 are assigned to a time slot within the calendar date designated by the itinerary entry, into the memory of the machine, at block 320. In one mode, the assignment is made manually by selecting time slots in the calendar. In another mode the assignment is made automatically based on pre-determined criteria, such as the time-slot corresponding to the last sales call or by querying a database of customer preferences. For example, Dr. Sue is assigned 9:00 to 9:30 AM on Monday Sep. 25, 2006 because her customer preference data entry states that she prefers 9:00 to 9:30 AM on MWF. The customer preferences can be stored on the user's machine or can be accessed from a central database, using a selectable link that can provide the representative with access to a central database where customer data is stored. The customer can include, but is not limited to, customer contact information, customer preferences for scheduling sales calls, customer use data such as a physicians prescribing habits, changes in customer use data such as largest increase or decrease in prescriptions written.

Customer preferences can be collected by the field representative and included in call notes that are uploaded to the central computer over a suitable communication link. During that same communication or in a separate communication session, the central computer can download to the user's machine information that is designated for receipt by the representative, including, in relevant part, any customer information that has been imported or otherwise provided to the central database server software. The data exchange is over a communication link between the central computer and the remote machine of the representative. In the event that the representative's machine includes wireless network capabilities (e.g., a broadband card that can connect the machine through a "hot spot"), the upload can occur whenever the system detects that it has secure network connectivity, and this process can be performed as a background thread while the user performs other tasks on the machine running the Territory Management System software. The data exchange can be conducted in accordance with the following co-pending applications: U.S. Provisional Application Ser. No. 60/867,943, filed on Nov. 30, 2006, entitled "Data Cache Techniques In Support Of Synchronization of Databases In A Distributed Environment," and U.S. Provisional Application Ser. No. 60/867,945, filed on Nov. 30, 2006, entitled "Software, Systems and Methodologies For Realignment of Remote Databases By A Central Database In Support of Field Representative Territory Assignments," which are each hereby incorporated by reference in their respective entireties.

Referring again to FIG. 3, the assignment of candidate matches to a time slot at block 320 is followed by the display of the assignments to the user at block 325. An exemplary display is shown in view 600 in FIG. 6. In this embodiment, the display is an editable tabular listing of the selected candidates, the memory assignments being shown as sales call events. The event information presented to the user can include call note information from the local database as well as other information and customer data such as the customer name, customer specialty, previous sales call date and the customer address. The user is presented with the originating itinerary date at 605. The user is also presented with the proposed calendar date for each event, the start time for the event, the end time for the event and activity category at 610. The user can also be presented with a drop-down menu to select a type of activity, such as a scheduled appointment or a drop-in. The default setting can be "drop in" in view of the fact that creating a schedule can be a prophetic act, and an appointment may not have yet been arranged with the customer. The user can be offered additional options such as the ability to change the appointment date, the start time, the end time or the activity category at 610, and the option to exclude any particular event by interacting with a check box at 635. Any changes made to the view are added to the memory assignment in the machine by selecting the Refresh button at 615.

Referring now to FIG. 3, the decision block at 330 determines whether the candidates are to be edited. If no edits are indicated by the user, the process proceeds to block 350 where the time slot memory assignments for each calendar date are populated into the calendar program. In one embodiment, the user initiates this action by selecting the Schedule button at 625 of FIG. 6. Once the memory assignments have been made, the process proceeds through B to process 100 at block 155 of FIG. 1. However, if the decision at block 330 is to edit the candidates, the process proceeds back to block 340, which action is initiated by the user through selection of the Back button 630 in FIG. 6, for example, and the user is presented view 500 in FIG. 5, through the user interface. The process proceeds at this point, from block 340, as described above.

Figure 7:
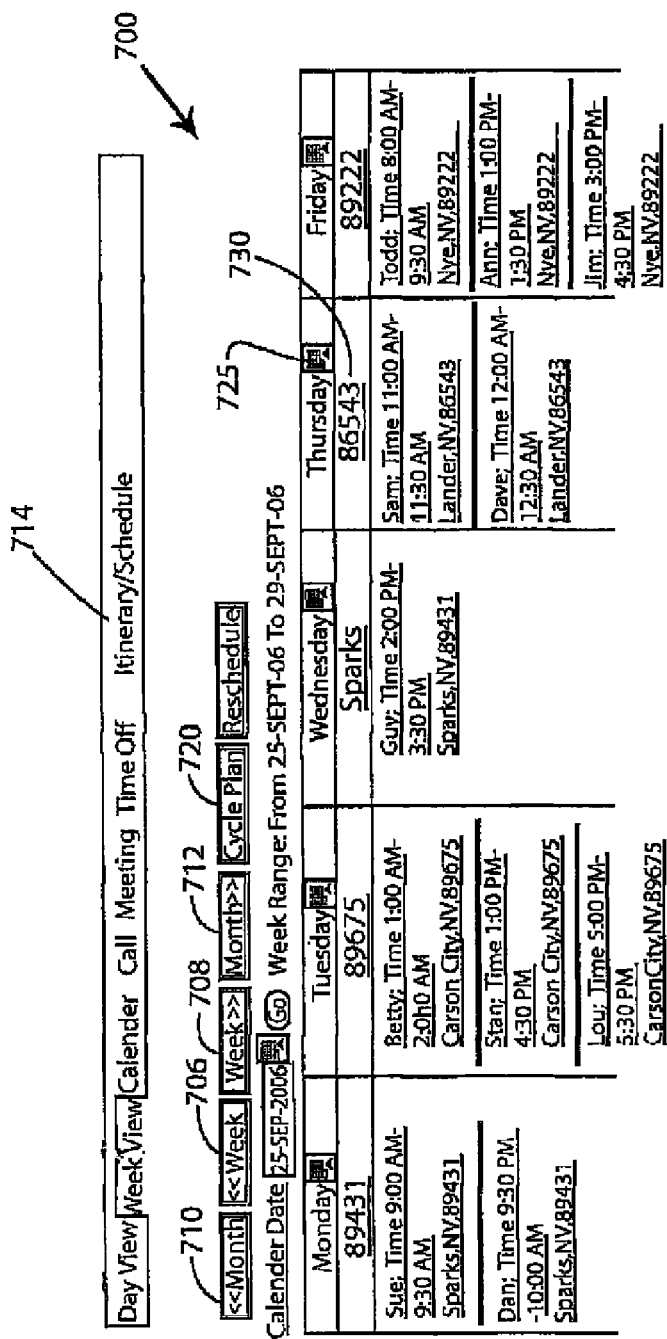
FIG. 7 is a sample one-week view of a user calendar after creating a schedule of events using an itinerary and customer data.

Referring again to FIG. 1, the process proceeds from B to block 155 and the user is presented with calendar view 700 in FIG. 7. Calendar view 700 shows an exemplary one-week calendar for the week of September 25 through Sep. 29, 2006. Other weeks can be selected through conventional navigation buttons 706, 708 to scroll to prior or later weeks, and buttons 710 and 712 to scroll to prior and later months. Each calendar day contains a display of the geographic region to be visited, as designated by the itinerary, at 730. Each of the calendar day displays can be accompanied by a calendar icon as shown at 725. The calendar icons are selected by the user in order to change the displayed dates. The user can be provided with a pop-up calendar to assist in selecting the date range. In the illustrated week, the representative will be in Zip Code 89431 on Monday Sep. 25, 2006 and will visit Dr. Sue at 9:00 AM and Dr. Dan at 9:30 AM. The geographic region, calendar date, customer and time-slot for this calendar entry were created with, and guided by, the software, system, and methods of the present invention. In addition, from this view, the user can access other territory management tools and functions, at any time through standard navigation, for example, using the Itinerary/Schedule button 714 on the navigation bar, or the Cycle Plan button at 720.

The process 300 in FIG. 3 can be invoked at any time by the user and is not limited to being performed from within process 100. Process 300 can be initiated, for example, through user selection of a geographic indicator, for example a city or Zip Code, from within the itinerary view 200 in FIG. 2.

The itinerary search tool can also be used in combination with the cycle planning tool to allow a field representative to design a schedule first by creating an itinerary based on geographic considerations such as equal territory coverage, travel optimization or available transportation, then replicate the itinerary on multiple dates, and then populate the geographic regions using specific customer criteria. By way of example, a field representative may use the process 100 in FIG. 1 to schedule a week long itinerary, designed to visit a different city on each day that maximizes equal territory coverage as guided by the city and Zip Code counter (415 and 420 in FIG. 4A), as described above. After committing the itinerary to the calendar at block 150, the representative uses the cycle planning tool, as described in the Cycle Planning disclosure, to replicate the week-long itinerary on the first week of every month for the first quarter (Q1) of the year. The sales representative then uses the itinerary search tool described in process 300 in FIG. 3, along with specific customer criteria, to select a unique set of sales calls for each of the first weeks of Q1: January, February and March. The representative further uses the cycle planning tool to replicate each of the three weeks in Q1 to repeat on each of the same three weeks in the second, third and fourth quarters of the year. The product of this process is a schedule in which the first monthly week for each quarter of the year is identical (i.e. week 1 of January is repeated on week 1 of April, July and October, week 1 of February is repeated on week 1 of May, August and November, and week 1 of March is repeated on week 1 of June, September and December). In addition, the process 100 guides the selection of geographic regions for the itinerary, the cycle planning tool replicates the itineraries on future dates, and the process 300 guides the selection of sales calls based on customer criteria.

In the foregoing description, certain flow diagrams have been shown and processes described in relation to those flow diagrams, which provide a reference for discussion purposes. In an actual implementation of the methods of the present invention, the steps can comprise event-driven routines that can run in parallel and can be launched and executed other than as shown by the simple depiction in the flow diagrams. For example, a number of edits can be made or obtained at block 145 through the user interface before the itinerary plan is committed to the calendar at block 150. In short, the particular order of the steps in the flow diagrams is illustrative of the invention, but not limiting of the various permutations that can be achieved in a given embodiment. Accordingly, it is the performance of the steps recited in the claims appended below which is pertinent, and not the order of operation of the steps themselves.

We claim:

1. A computer-assisted method for electronically creating an itinerary schedule of drop-in sales call events for a representative in a calendar program in support of sales calls to one or more customers of the representative within a territory of the representative, comprising the steps of:

loading an interactive user-interface with a first set of geographic indicators and a second set of calendar dates into a memory of a machine wherein the first set of geographic indicators concern locations within the territory;

interacting with the user-interface so as to assign within the memory of the machine, using a processor of the machine, at least one geographic indicator selected from the first set to at least one calendar date in the second set and thereby define an itinerary entry independent of any determination of the customers of the representative to be called upon in the itinerary entry and independent of any connectivity or coordination of calendars maintained by the customers of the representative;

updating a counter for each selection of a particular geographic indicator through interaction with the user-interface, wherein the counter counts the number of times each particular geographic indicator has been interacted with;

displaying the counter in the interactive user-interface to provide guidance to the representative prior to his or her defining any further itinerary entry of a geography within the territory to be visited; and including the itinerary entry for the at least one calendar date into the calendar program on respective dates which correspond to the at least one calendar date, wherein the defined itinerary entry comprises an entry in the calendar of the representative to make a drop-in sales call to at least one customer of the representative within the territory of the representative.

2. The method of claim 1, including the additional step of displaying through the user-interface the itinerary entry in the calendar program after the including step.

3. The method of claim 1, including the additional step of displaying through the user-interface the itinerary entry in the calendar program after the including step.

4. The method of claim 1, including the additional step of selecting one or more health care providers that are associated with at least one geographic indicator in the set of geographic indicators after the interacting step.

5. The method of claim 4, wherein the including step includes any selected health care providers as part of the itinerary entry.

6. The method of claim 5, wherein data associated with any selected health care providers is included in a time slot in the calendar program.

7. A computer-assisted method for electronically creating drop-in sales call events for inclusion in a calendar program of a representative in support of sales calls to one or more customers of the representative within a territory of the representative comprising the steps of:

selecting a geographic indicator and a calendar date through an interactive user-interface;

assigning the geographic indicator to the calendar date within a memory of a machine using a processor of the machine;

updating a counter in response to the selection of the geographic indicator through the interactive user-interface, wherein the counter counts the number of times each particular geographic indicator has been interacted with;

displaying the counter in the interactive user-interface to provide guidance to the representative prior to his or her selecting any further geographic indicator;

executing a search of a database on the machine to identify at least one candidate having a matching geographic indicator, wherein the candidate is among the customers of the representative within the territory;

automatically assigning in the memory at least a portion of any candidate matches to a time slot within the calendar date; and populating one or more time slots of the calendar program with the memory assignments, wherein the foregoing steps are performed free of any connectivity or coordination of calendars maintained by the candidates such that the one or more time slots are populated with one or more drop-in sales calls to one or more of the customers of the representative.

8. The method of claim 7, wherein the obtaining step includes a geographic indicator within a territory of a representative.

9. The method of claim 7, including the additional step of displaying through the user-interface the itinerary entry in the calendar program after the populating step.

10. The method of claim 9, including the additional step, prior to the assigning step, of selecting one or more candidates, and wherein the assigned portion of candidate matches includes the one or more selected candidates.

11. The method of claim 7, wherein the assigning step further comprises using a candidate preference in the step of assigning the portion to respective time slots.

12. The method of claim 11, wherein the candidate preference is stored in a database on the machine.

13. The method of claim 11, wherein the candidate preference is stored in a database on a central server.

14. A computer-assisted method for electronically populating a calendar program for a representative with an event using an itinerary entry in support of drop-in sales calls to one or more customers of the representative within a territory of the representative, comprising the steps of:

obtaining an assignment of a geographic indicator to a calendar date from the itinerary entry in an interactive user-interface;

updating a counter in view of the obtained assignment of the geographic indicator in the interactive user-interface, wherein the counter counts the number of times the geographic indicator has been obtained;

displaying the counter in the interactive user-interface to provide guidance to the representative prior to obtaining any further assignments of geographic indicators;

inputting one or more search criteria;

executing a search of a database to identify at least one candidate matching the geographic indicator and the one or more search criteria, wherein the candidate is among the customers of the representative within the territory;

automatically assigning in a memory at least a portion of any candidate matches to a time slot within the calendar date using a processor of a machine; and populating each time slot of the calendar program with the memory assignments for the calendar date, wherein the foregoing steps are performed free of any connectivity or coordination of calendars maintained by the candidates such that the one or more time slots are populated with one or more drop-in sales calls to one or more of the customers of the representative.

15. The method of claim 14, including the additional step of displaying through the user-interface the itinerary entry in the calendar program after the populating step.

16. The method of claim 15, including the additional step, prior to the assigning step, of selecting one or more candidates, and wherein the assigned portion of candidate matches includes the one or more selected candidates.

17. The method of claim 14, wherein the assigning step further comprises using a candidate preference in the step of assigning the portion to respective time slots.

18. The method of claim 17, wherein the candidate preferences are stored in a database on the machine.

19. The method of claim 17, wherein the candidate preferences are stored in a database on a central server.

20. The method of claim 14, wherein the search criteria is a time since last visit.

* * * * *